United States Patent
Tian et al.

(10) Patent No.: US 9,351,176 B2
(45) Date of Patent: May 24, 2016

(54) PHASE AND AMPLITUDE TRACKING IN THE PRESENCE OF A WALKING PILOT SIGNAL

(71) Applicant: Qualcomm Incorporated, San Diego, CA (US)

(72) Inventors: Tao Tian, San Diego, CA (US); Sameer Vermani, San Diego, CA (US); Lin Yang, San Diego, CA (US); Albert van Zelst, Woerden (NL)

(73) Assignee: QUALCOMM Incorporated, San Diego, CA (US)

( * ) Notice: Subject to any disclaimer, the term of this patent is extended or adjusted under 35 U.S.C. 154(b) by 418 days.

(21) Appl. No.: 13/735,937

(22) Filed: Jan. 7, 2013

(65) Prior Publication Data

US 2013/0176879 A1  Jul. 11, 2013

(51) Int. Cl.
| | | |
|---|---|---|
| *H04W 24/02* | (2009.01) | |
| *H04W 52/02* | (2009.01) | |
| *H04W 72/04* | (2009.01) | |
| *H04L 25/02* | (2006.01) | |
| *H04L 25/03* | (2006.01) | |

(52) U.S. Cl.
CPC .......... *H04W 24/02* (2013.01); *H04L 25/0204* (2013.01); *H04L 25/0228* (2013.01); *H04L 25/03159* (2013.01); *H04W 52/0209* (2013.01); *H04W 72/042* (2013.01)

(58) Field of Classification Search
CPC . H04L 25/00; H04L 25/03159; H04L 25/024; H04L 25/0202–25/0258; H04W 52/0209; H04W 72/042; H04W 24/02; H04W 88/08
USPC ........................................................ 370/252
See application file for complete search history.

(56) References Cited

U.S. PATENT DOCUMENTS

| | | | | |
|---|---|---|---|---|
| 6,049,577 | A * | 4/2000 | Gothe .................... | H04L 7/041 370/514 |
| 6,788,661 | B1 * | 9/2004 | Ylitalo ................. | H04B 7/0617 342/359 |
| 6,856,947 | B2 * | 2/2005 | Antoine et al. ............... | 702/189 |
| 8,380,133 | B2 * | 2/2013 | Lakshmanan ........ | H04B 7/0617 455/226.3 |
| 2006/0018297 | A1 * | 1/2006 | Gorokhov ........... | H04L 25/0236 370/343 |
| 2007/0036239 | A1 * | 2/2007 | Ma et al. ........................ | 375/316 |
| 2009/0161771 | A1 * | 6/2009 | Schwoerer .......... | H04L 27/2657 375/260 |
| 2009/0225885 | A1 * | 9/2009 | Aoki ....................... | H04B 7/10 375/260 |
| 2012/0087419 | A1 * | 4/2012 | Khojastepour ...... | H04B 7/0684 375/259 |
| 2012/0209604 | A1 * | 8/2012 | Sehlstedt ...................... | 704/233 |
| 2012/0269142 | A1 * | 10/2012 | Porat ................. | H04W 72/1231 370/329 |

(Continued)

*Primary Examiner* — Mark Rinehart
*Assistant Examiner* — Kenneth P Hunt
(74) *Attorney, Agent, or Firm* — Eric Ho (57) ABSTRACT

A method and apparatus for tracking amplitude and phase of a received low frequency signal comprising a walking pilot signal is disclosed, wherein the pilot signal changes in frequency a number of times according to a sequence that repeats. The design includes initializing a FIFO buffer and summing estimated channel power over the sequence to determine an initial total power. The design also includes, for a new received symbol, determining an updated power estimate for the new received symbol, placing the updated power estimate in the FIFO buffer, and removing a least current value from the FIFO buffer, and estimating amplitude of the signal using a sum of all updated power estimates in the FIFO buffer divided by the initial total power. The design may further include determining a delta phase value using maximum ratio combining scaled with a scaling factor.

32 Claims, 4 Drawing Sheets

(56) References Cited

U.S. PATENT DOCUMENTS

| | | | |
|---|---|---|---|
| 2013/0223359 A1* | 8/2013 | Kenney et al. | 370/329 |
| 2014/0010324 A1* | 1/2014 | Kenney | H04L 27/22 375/284 |
| 2014/0050254 A1* | 2/2014 | Azizi | H04L 27/2666 375/219 |
| 2014/0126385 A1* | 5/2014 | Azizi | H04L 5/0048 370/252 |
| 2014/0185656 A1* | 7/2014 | Azizi | H04L 25/0202 375/219 |
| 2015/0078494 A1* | 3/2015 | Talvitie et al. | 375/346 |

* cited by examiner

PHASE AND AMPLITUDE TRACKING IN THE PRESENCE OF A WALKING PILOT SIGNAL

BACKGROUND

I. Field

The present disclosure relates generally to the art of telecommunications, and more specifically to accurate phase and amplitude tracking in newer low frequency WiFi environments.

II. Background

The 802.11 WiFi standard enables the implementation of wireless local area networks. Newer 802.11 standards have been discussed that will operate with increased speed, increased bandwidth, and are projected to enable operation in various frequency bands. Different versions of 802.11 have been proposed, including 802.11ac, 802.11ad, 802.11af, and 802.11ah. Each of these versions offers different benefits, but in certain instances, operation according to these protocols presents certain challenges.

As an example, transmission at frequencies below 1 GHz enables communications over a longer range. In such a low frequency scenario, throughput is not relatively high, and in some instances 100 kbps may be encountered. The issue with such an arrangement is that the transmission bandwidth tends to be very low, and data transmitted using previous 802.11 protocols simply is not transmittable fast enough. Certain proposals have been suggested to deal with this situation, including altering the pilot signal to occur at various points during a transmitted frame, changing between frequencies, known as employing a "walking pilot."

When the pilot and other transmitted signals vary during a frame, the receiver can have difficulty discerning both the pilot signal and the other transmitted signals in that there can be uncertainty about the data received, particularly due to Doppler effects. As a result, estimating phase and amplitude of the received signal can be difficult, as phase and amplitude of the received signal may deviate from an expected value due to the associated uncertainties. Further, power distribution can vary in the frequency domain because of the analog and digital front end filters and the channel variances.

It would therefore be beneficial to provide a system that can more accurately track signal phase and amplitude in signals that vary in the frequency domain.

SUMMARY

Techniques for tracking amplitude and phase of a received low frequency signal comprising a walking pilot signal are disclosed, wherein the pilot signal changes in frequency a number of times according to a sequence that repeats. The design includes initializing a FIFO buffer and summing estimated channel power over the sequence to determine an initial total power. The design also includes, for each new received symbol, determining an updated power estimate for the new received symbol, placing the updated power estimate in the FIFO buffer, and removing a least current value from the FIFO buffer, and estimating amplitude of the signal using a sum of all updated power estimates in the FIFO buffer divided by the initial total power. The design may further include determining a delta phase value using maximum ratio combining scaled with a scaling factor.

Various aspects and features of the disclosure are described in further detail below.

DETAILED DESCRIPTION

The present design seeks to determine received signal amplitude estimates and opportunistically combine signal phase estimates across OFDM symbols based on a minimum mean squared error (MMSE) determination.

In general, wireless network technologies may include various types of wireless local area networks (WLANs). A WLAN may be used to interconnect nearby devices together, employing widely used networking protocols. The various aspects described herein may apply to any communication standard, such as WiFi or, more generally, any member of the IEEE 802.11 family of wireless protocols. For example, the various aspects described herein may be used as part of the IEEE 802.11ah protocol, which uses sub-1 GHz bands.

In some aspects, wireless signals in a sub-gigahertz band may be transmitted according to the 802.11ah protocol using orthogonal frequency-division multiplexing (OFDM), direct-sequence spread spectrum (DSSS) communications, a combination of OFDM and DSSS communications, or other schemes. Implementations of the 802.11ah protocol may be used for sensors, metering, and smart grid networks. Advantageously, aspects of certain devices implementing the 802.11ah protocol may consume less power than devices implementing other wireless protocols, and/or may be used to transmit wireless signals across a relatively long range, for example about one kilometer or longer.

In some implementations, a WLAN includes various devices which are the components that access the wireless network. For example, there may be two types of devices: access points ("APs") and clients (also referred to as stations, or "STAs"). In general, an AP serves as a hub or base station for the WLAN and an STA serves as a user of the WLAN. For example, a STA may be a laptop computer, a personal digital assistant (PDA), a mobile phone, etc. In an example, an STA connects to an AP via a WiFi (e.g., IEEE 802.11 protocol such as 802.11ah) compliant wireless link to obtain general connectivity to the Internet or to other wide area networks. In some implementations an STA may also be used as an AP.

An access point ("AP") may also comprise, be implemented as, or known as a NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, or some other terminology.

A station "STA" may also comprise, be implemented as, or known as an access terminal ("AT"), a subscriber station, a subscriber unit, a mobile station, a remote station, a remote terminal, a user terminal, a user agent, a user device, user equipment, or some other terminology. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

As discussed above, certain of the devices described herein may implement the 802.11ah standard, for example. Such devices, whether used as an STA or AP or other device, may be used for smart metering or in a smart grid network. Such devices may provide sensor applications or be used in home automation. The devices may instead or in addition be used in a healthcare context, for example for personal healthcare. They may also be used for surveillance, to enable extended-range Internet connectivity (e.g., for use with hotspots), or to implement machine-to-machine communications.

Certain of the devices described herein may further implement Multiple Input Multiple Output (MIMO) technology and be implemented as part of the 802.11ah standard. A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels or streams, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

Figure 1:
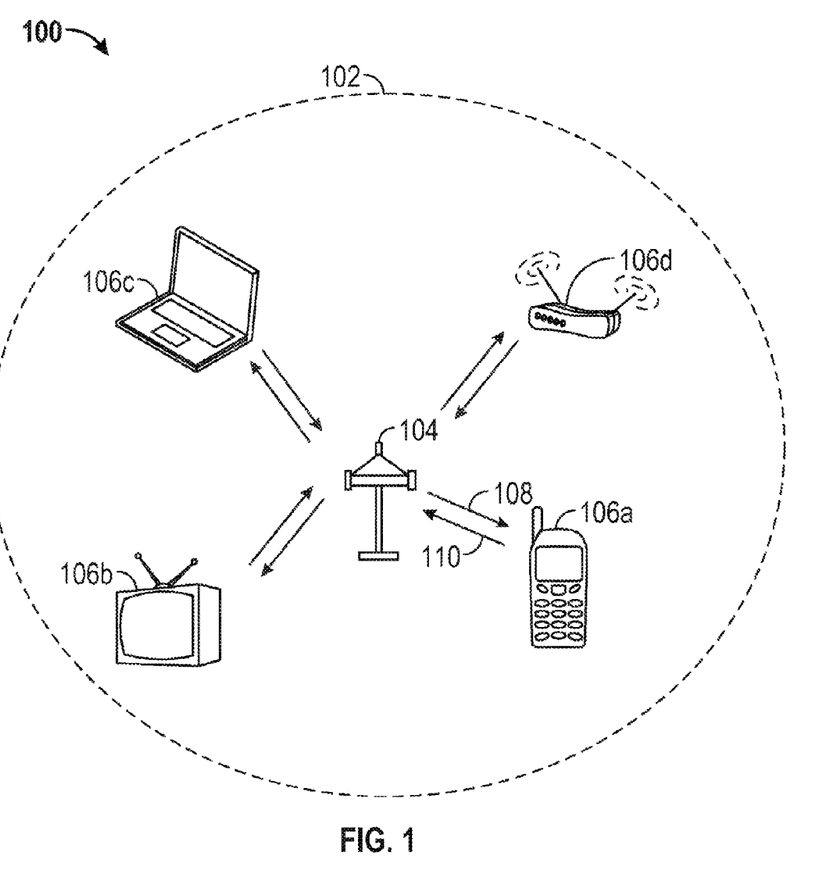
FIG. 1 illustrates an example of a wireless communication system in which aspects of the present disclosure may be employed.

FIG. 1 illustrates an example of a wireless communication system 100 in which aspects of the present disclosure may be employed. The wireless communication system 100 may operate pursuant to a wireless standard, for example the 802.11ah standard. The wireless communication system 100 may include an AP 104, which communicates with STAs 106.

A variety of processes and methods may be used for transmissions in the wireless communication system 100 between the AP 104 and the STAs 106. For example, signals may be sent and received between the AP 104 and the STAs 106 in accordance with OFDM/OFDMA techniques. If this is the case, the wireless communication system 100 may be referred to as an OFDM/OFDMA system. Alternatively, signals may be sent and received between the AP 104 and the STAs 106 in accordance with CDMA techniques. If this is the case, the wireless communication system 100 may be referred to as a CDMA system.

A communication link that facilitates transmission from the AP 104 to one or more of the STAs 106 may be referred to as a downlink (DL) 108, and a communication link that facilitates transmission from one or more of the STAs 106 to the AP 104 may be referred to as an uplink (UL) 110. Alternatively, a downlink 108 may be referred to as a forward link or a forward channel, and an uplink 110 may be referred to as a reverse link or a reverse channel.

The AP 104 may act as a base station and provide wireless communication coverage in a basic service area (BSA) 102. The AP 104 along with the STAs 106 associated with the AP 104 and that use the AP 104 for communication may be referred to as a basic service set (BSS). It should be noted that the wireless communication system 100 may not have a central AP 104, but rather may function as a peer-to-peer network between the STAs 106. Accordingly, the functions of the AP 104 described herein may alternatively be performed by one or more of the STAs 106.

Figure 2:
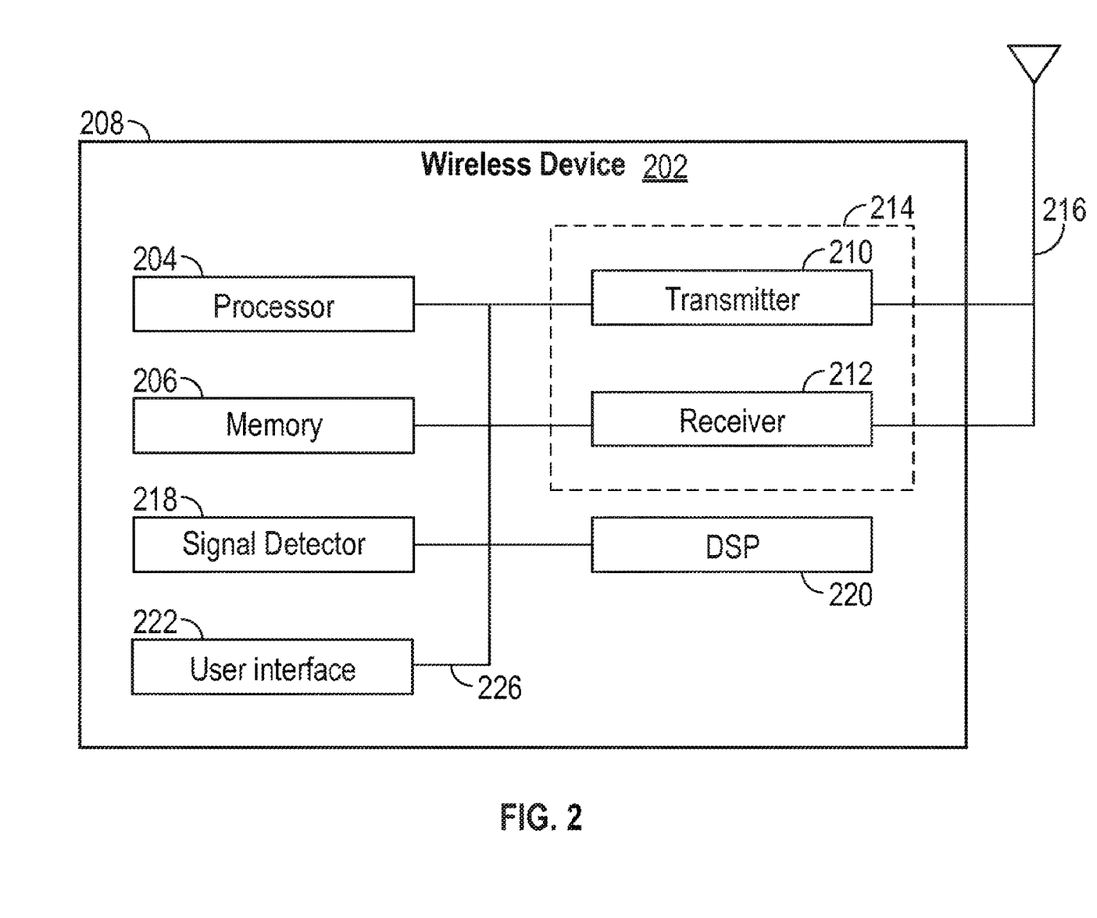
FIG. 2 shows a functional block diagram of an exemplary wireless device that may be employed within the wireless communication system of FIG. 1.

FIG. 2 illustrates various components that may be utilized in a wireless device 202 that may be employed within the wireless communication system 100. The wireless device 202 is an example of a device that may be configured to implement the various methods described herein. For example, the wireless device 202 may comprise the AP 104 or one of the STAs 106.

The wireless device 202 may include a processor 204 which controls operation of the wireless device 202. The processor 204 may also be referred to as a central processing unit (CPU). Memory 206, which may include both read-only memory (ROM) and random access memory (RAM), provides instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

The processor 204 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 202 may also include a housing 208 that may include a transmitter 210 and a receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. The wireless device 202 may also include (not shown) multiple transmitters, multiple receivers, multiple transceivers, and/or multiple antennas.

The wireless device 202 may also include a signal detector 218 that may be used in an effort to detect and quantify the level of signals received by the transceiver 214. The signal detector 218 may detect such signals as total energy, energy per subcarrier per symbol, power spectral density and other signals. The wireless device 202 may also include a digital signal processor (DSP) 220 for use in processing signals. The DSP 220 may be configured to generate a data unit for transmission. In some aspects, the data unit may comprise a physical layer data unit (PPDU). In some aspects, the PPDU is referred to as a packet.

The wireless device 202 may further comprise a user interface 222 in some aspects. The user interface 222 may comprise a keypad, a microphone, a speaker, and/or a display. The user interface 222 may include any element or component that conveys information to a user of the wireless device 202 and/or receives input from the user.

The various components of the wireless device 202 may be coupled together by a bus system 226. The bus system 226 may include a data bus, for example, as well as a power bus, a control signal bus, and a status signal bus in addition to the data bus. Those of skill in the art will appreciate the components of the wireless device 202 may be coupled together or accept or provide inputs to each other using some other mechanism.

Although a number of separate components are illustrated in FIG. 2, those of skill in the art will recognize that one or more of the components may be combined or commonly implemented. For example, the processor 204 may be used to implement not only the functionality described above with respect to the processor 204, but also to implement the functionality described above with respect to the signal detector 218 and/or the DSP 220. Further, each of the components illustrated in FIG. 2 may be implemented using a plurality of separate elements. Furthermore the processor 204 may be used to implement any of the components, modules, circuits, or the like described below, or each may be implemented using a plurality of separate elements.

Figure 3:
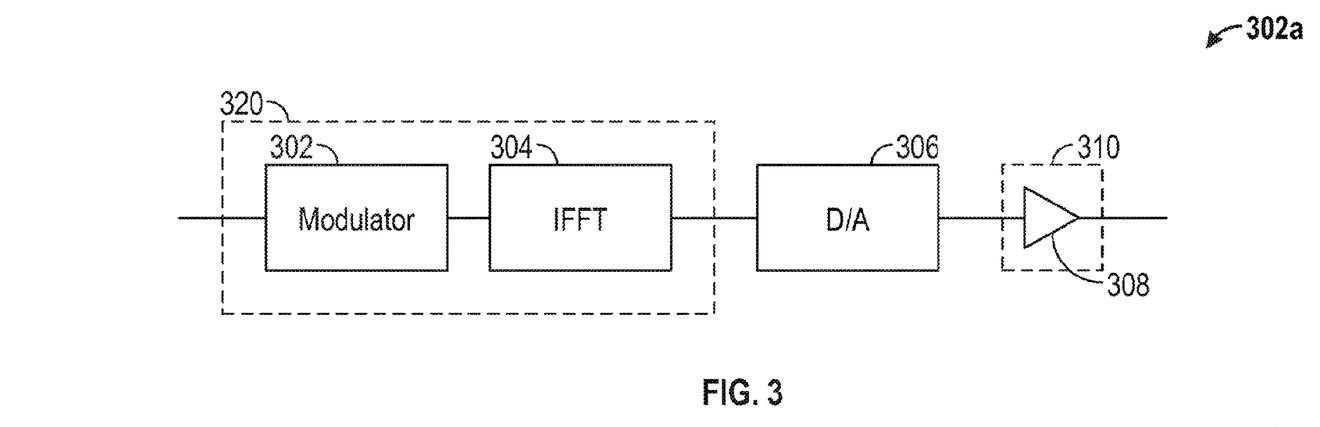
FIG. 3 shows a functional block diagram of exemplary components that may be utilized in the wireless device of FIG. 2 to transmit wireless communications.

As discussed above, the wireless device 202 may comprise an AP 104 or an STA 106, and may be used to transmit and/or receive communications. FIG. 3 illustrates various components that may be utilized in the wireless device 202 to transmit wireless communications. The components illustrated in FIG. 3 may be used, for example, to transmit OFDM communications. In some aspects, the components illustrated in FIG. 3 are used to generate and transmit packets to be sent over a bandwidth of less than or equal to 1.25 MHz, as will be discussed in additional detail below. For ease of reference, the wireless device 202 configured with the components illustrated in FIG. 3 is hereinafter referred to as a wireless device 302a.

The wireless device 302a may comprise a modulator 302 configured to modulate bits for transmission. For example, the modulator 302 may determine a plurality of symbols from bits received from the processor 204 (FIG. 2) or the user interface 222 (FIG. 2), for example by mapping bits to a plurality of symbols according to a constellation. The bits may correspond to user data or to control information. In some aspects, the bits are received in codewords. In one aspect, the modulator 302 comprises a QAM (quadrature amplitude modulation) modulator, for example a 16-QAM modulator or a 64-QAM modulator. In other aspects, the modulator 302 comprises a binary phase-shift keying (BPSK) modulator or a quadrature phase-shift keying (QPSK) modulator.

The wireless device 302a may further comprise a transform module 304 configured to convert symbols or otherwise modulated bits from the modulator 302 into a time domain. In FIG. 3, the transform module 304 is illustrated as being implemented by an inverse fast Fourier transform (IFFT) module. In some implementations, there may be multiple transform modules (not shown) that transform units of data of different sizes. In some implementations, the transform module 304 may be itself configured to transform units of data of different sizes. For example, the transform module 304 may be configured with a plurality of modes, and may use a different number of points to convert the symbols in each mode. For example, the IFFT may have a mode where 32 points are used to convert symbols being transmitted over 32 tones (i.e., subcarriers) into a time domain, and a mode where 64 points are used to convert symbols being transmitted over 64 tones into a time domain. The number of points used by the transform module 304 may be referred to as the size of the transform module 304.

In FIG. 3, the modulator 302 and the transform module 304 are illustrated as being implemented in the DSP 320. In some aspects, however, one or both of the modulator 302 and the transform module 304 are implemented in the processor 204 or in another element of the wireless device 302a (e.g., see describe above with reference to FIG. 2).

As discussed above, the DSP 320 may be configured to generate a data unit for transmission. In some aspects, the modulator 302 and the transform module 304 may be configured to generate a data unit comprising a plurality of fields including control information and a plurality of data symbols. The fields including the control information may comprise one or more training fields, for example, and one or more signal (SIG) fields. Each of the training fields may include a known sequence of values or symbols. Each of the SIG fields may include information about the data unit, for example a description of a length or data rate of the data unit.

Returning to the description of FIG. 3, the wireless device 302a may further comprise a digital to analog converter 306 configured to convert the output of the transform module into an analog signal. For example, the time-domain output of the transform module 306 may be converted to a baseband OFDM signal by the digital to analog converter 306. The digital to analog converter 306 may be implemented in the processor 204 or in another element of the wireless device 202. In some aspects, the digital to analog converter 306 is implemented in the transceiver 214 (FIG. 2) or in a data transmit processor.

The analog signal may be wirelessly transmitted by the transmitter 310. The analog signal may be further processed before being transmitted by the transmitter 310, for example by being filtered or by being upconverted to an intermediate or carrier frequency. In the aspect illustrated in FIG. 3, the transmitter 310 includes a transmit amplifier 308. Prior to being transmitted, the analog signal may be amplified by the transmit amplifier 308. In some aspects, the amplifier 308 comprises a low noise amplifier (LNA).

The transmitter 310 is configured to transmit one or more packets or data units in a wireless signal based on the analog signal. The data units may be generated using the processor 204 (FIG. 2) and/or the DSP 320, for example using the modulator 302 and the transform module 304 as discussed above.

Figure 4:
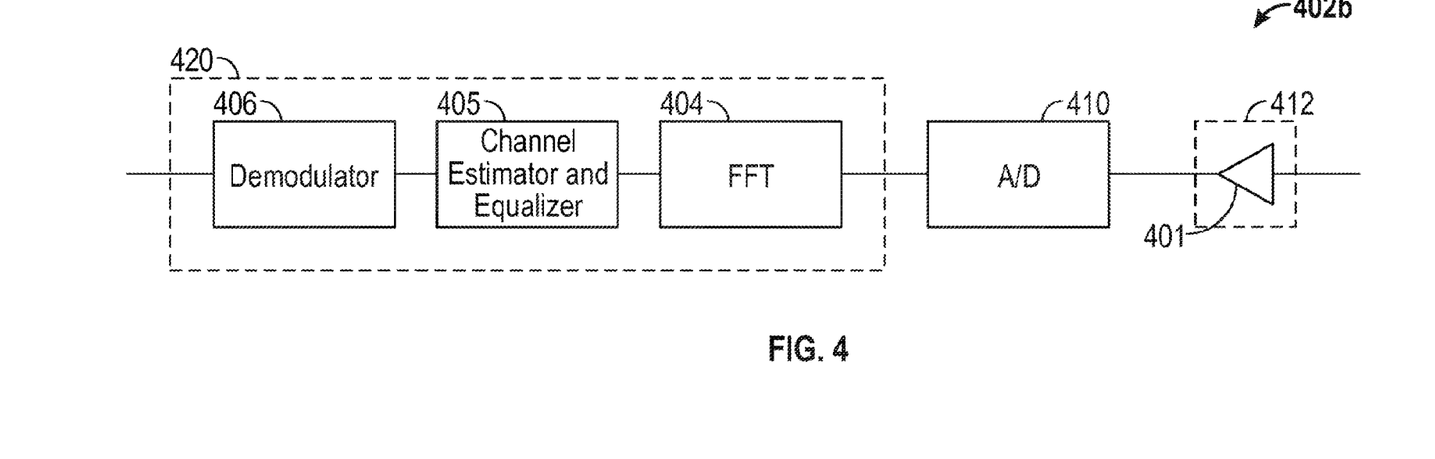
FIG. 4 shows a functional block diagram of exemplary components that may be utilized in the wireless device of FIG. 2 to receive wireless communications.

FIG. 4 illustrates various components that may be utilized in the wireless device 202 to receive wireless communications. The components illustrated in FIG. 4 may be used, for example, to receive OFDM communications. In some aspects, the components illustrated in FIG. 4 are used to receive data units over a bandwidth of equal to or less than 1.25 MHz. For example, the components illustrated in FIG. 4 may be used to receive data units transmitted by the components discussed above with respect to FIG. 3. For ease of reference, the wireless device 202 configured with the components illustrated in FIG. 4 is hereinafter referred to as a wireless device 402b.

The receiver 412 is configured to receive one or more packets or data units in a wireless signal.

In the aspect illustrated in FIG. 4, the receiver 412 includes a receive amplifier 401. The receive amplifier 401 may be configured to amplify the wireless signal received by the receiver 412. In some aspects, the receiver 412 is configured to adjust the gain of the receive amplifier 401 using an automatic gain control (AGC) procedure. In some aspects, the automatic gain control uses information in one or more received training fields, such as a received short training field (STF) for example, to adjust the gain. Those having ordinary skill in the art will understand methods for performing AGC. In some aspects, the amplifier 401 comprises an LNA.

The wireless device 402b may comprise an analog to digital converter 410 configured to convert the amplified wireless signal from the receiver 412 into a digital representation thereof. Further to being amplified, the wireless signal may be processed before being converted by the digital to analog converter 410, for example by being filtered or by being downconverted to an intermediate or baseband frequency. The analog to digital converter 410 may be implemented in the processor 204 (FIG. 2) or in another element of the wireless device 402b. In some aspects, the analog to digital converter 410 is implemented in the transceiver 214 (FIG. 2) or in a data receive processor.

The wireless device 402b may further comprise a transform module 404 configured to convert the representation the wireless signal into a frequency spectrum. In FIG. 4, the transform module 404 is illustrated as being implemented by a fast Fourier transform (FFT) module. As described above with reference to FIG. 3, the transform module 404 may be configured with a plurality of modes, and may use a different number of points to convert the signal in each mode. For example, the transform module 404 may have a mode where 32 points are used to convert a signal received over 32 tones into a frequency spectrum, and a mode where 64 points are used to convert a signal received over 64 tones into a frequency spectrum. The number of points used by the transform module 404 may be referred to as the size of the transform module 404. In some aspects, the transform module 404 may identify a symbol for each point that it uses.

The wireless device 402b may further comprise a channel estimator and equalizer 405 configured to form an estimate of the channel over which the data unit is received, and to remove certain effects of the channel based on the channel estimate. For example, the channel estimator 405 may be configured to approximate a function of the channel, and the channel equalizer may be configured to apply an inverse of that function to the data in the frequency spectrum.

In some aspects, the channel estimator and equalizer 405 uses information in one or more received training fields, such as a long training field (LTF) for example, to estimate the channel. The channel estimate may be formed based on one or more LTFs received at the beginning of the data unit. This channel estimate may thereafter be used to equalize data symbols that follow the one or more LTFs. After a certain period of time or after a certain number of data symbols, one or more additional LTFs may be received in the data unit. The channel estimate may be updated or a new estimate formed using the additional LTFs. This new or update channel estimate may be used to equalize data symbols that follow the additional LTFs. In some aspects, the new or updated channel estimate is used to re-equalize data symbols preceding the additional LTFs. Those having ordinary skill in the art will understand methods for forming a channel estimate.

The wireless device 402b may further comprise a demodulator 406 configured to demodulate the equalized data. For example, the demodulator 406 may determine a plurality of bits from symbols output by the transform module 404 and the channel estimator and equalizer 405, for example by reversing a mapping of bits to a symbol in a constellation. The bits may be processed or evaluated by the processor 204 (FIG. 2), or used to display or otherwise output information to the user interface 222 (FIG. 2). In this way, data and/or information may be decoded. In some aspects, the bits correspond to codewords. In one aspect, the demodulator 406 comprises a QAM (quadrature amplitude modulation) demodulator, for example a 16-QAM demodulator or a 64-QAM demodulator. In other aspects, the demodulator 406 comprises a binary phase-shift keying (BPSK) demodulator or a quadrature phase-shift keying (QPSK) demodulator.

In FIG. 4, the transform module 404, the channel estimator and equalizer 405, and the demodulator 406 are illustrated as being implemented in a DSP 420. In some aspects, however, one or more of the transform module 404, the channel estimator and equalizer 405, and the demodulator 406 are implemented in the processor 204 (FIG. 2) or in another element of the wireless device 202 (FIG. 2).

As discussed above, the wireless signal received at the receiver 212 comprises one or more data units. Using the functions or components described above, the data units or data symbols therein may be decoded evaluated or otherwise evaluated or processed. For example, the processor 204 (FIG. 2) and/or the DSP 420 may be used to decode data symbols in the data units using the transform module 404, the channel estimator and equalizer 405, and the demodulator 406.

Data units exchanged by the AP 104 and the STA 106 may include control information or data, as discussed above. At the physical (PHY) layer, these data units may be referred to as physical layer protocol data units (PPDUs). In some aspects, a PPDU may be referred to as a packet or physical layer packet. Each PPDU may comprise a preamble and a payload. The preamble may include training fields and a SIG field. The payload may comprise a Media Access Control (MAC) header or data for other layers, and/or user data, for example. The payload may be transmitted using one or more data symbols. The systems, methods, and devices herein may utilize data units with training fields whose peak-to-power ratio has been minimized The wireless device 302a shown in FIG. 3 shows an example of a single transmit chain to be transmitted over an antenna. In some implementations, the wireless device 302a may implement a portion of a MIMO system using multiple antennas to simultaneously transmit data.

Phase and Amplitude Tracking

Phase and amplitude tracking may be employed in the signal detector 218 and/or DSP 220 of wireless device 202. As noted, during low frequency transmission according to a standard such as 802.11 ah, a "walking pilot" arrangement may be employed wherein the pilot signal changes or varies in the frequency domain. In general, the pilot signal appears at different points in different transmitted frames in an irregular sequence, i.e. a non-sequential order. The receiver, due primarily to Doppler effects but also due to other environmental conditions, may have difficulty determining the frame contents and the position of the pilot in the frame. Tracking of phase and amplitude, or in other words, the ability to obtain accurate phase and amplitude values at the receiver, is highly desirable.

In such a "walking pilot" scenario, the wireless device 202 initially sums the power received ($P^{(i)}$) for every frequency employed in a given walking pilot pattern. A walking pilot pattern is in essence a sequence, such as in a 64 frequency scenario, the pilot signal walking from frequency 33 to frequency 18 to frequency 52 to frequency 9, and so forth until the sequence again resumes. In this scenario, all 64 or less than all 64 frequencies may be employed for the walking pilot. An arrangement wherein more or less than 64 frequencies may at some point include the pilot signal may be used.

For each OFDM symbol, the received value on the $k^{th}$ subcarrier is:

$$x_k = H_k S_k e^{j\phi} + z_k \qquad \text{Equation 1.}$$

where k is between 1 and the total number of pilots in the walking pilot pattern and represents the subcarrier index, $H_k$ is the channel (over-the-air transmission matrix), $s_k$ the transmitted value, i.e. transmitted data from the transmitter, and $z_k$ the additive white Gaussian noise (AWGN). $\phi$ is the phase shift for the current OFDM symbol, and $e^{j\phi}$ represents the difference between the transmitted local oscillator value and the received local oscillator signal that needs to be tracked.

$x_k$ may be a vector representing OFDM symbols received on multiple antennas. When reduced to a single antenna, $x_k$ is a scalar. $H_k$ is typically a matrix but may be reduced to a vector when considering a single antenna and single subcarrier. Under normal steady state conditions, $\phi$ is expected to vary slowly.

The present design employs maximal ratio combining (MRC) to phase track the OFDM symbol. MRC provides diversity combining and entails summing the signals from each channel, providing a gain of each channel proportional to the rms (root mean square) signal level and inversely proportional to the mean square noise level of the channel, and using different proportionality constants for each channel, thus amplifying channels or components with a strong signal and attenuating channels or components with a weak signal.

Using MRC, the wireless device determines the expected value of the phase shift $e^{j\phi}$, $E(e^{j\phi})$, as being equal to:

$$E(e^{j\phi}) = (\Sigma_k y_k)/(\Sigma_k \|\hat{H}_k s_k\|^2) \qquad \text{Equation 2.}$$

where $\hat{H}_k$ is the estimate of $H_k$, and $y_k$ is equal to:

$$y_k = (\hat{H}_k s_k)^H x_k = \|\hat{H}_k s_k\|^2 e^{j\phi} + (H\hat{H}_k s_k)^H z'_k \qquad \text{Equation 3.}$$

z'k is the effective AWGN, assumed quasi-uniform over all subcarriers.

The difference between the expected value of $E(e^{j\phi})$ and the actual phase shift $e^{j\phi}$ is:

$$E(e^{j\phi}) - e^{j\phi} = (\Sigma_k (\hat{H}_k s_k)^H z'_k)/(\Sigma_k \|\hat{H}_k s_k\|^2) \qquad \text{Equation 4.}$$

This value is called z".

If the expected value of the phase shift for the current symbol $\phi$ minus the actual value of $\phi$ is much less than one, then $E(\phi) - \phi$ is approximately equal to the imaginary value of z", which is called n.

The mean square error of n is equal to:

$$\sigma_z^2 / (2\Sigma_k \|\hat{H}_k s_k\|^2) \qquad \text{Equation 5.}$$

where $\sigma_z^2 = E(z'_k z'^H_k)$ is the per-dimension variance of AWGN z', and is approximately equal to:

$$1/\Sigma_k \|\hat{H}_k s_k\|^2$$

which is equal to 1/P, or the inverse of total pilot power. Thus the mean square error (MSE) of the phase estimate is proportional to the inverse of the power of the pilot signal.

For multiple OFDM symbols, the expected value of the phase shift for symbol i minus the actual value is n for symbol i, where i is the OFDM symbol index. Using linear combining, $$\Sigma_i \alpha^{(i)} E(\phi^{(i)}) - \phi = \Sigma_i \alpha^{(i)} n^{(i)} \qquad \text{Equation 6.}$$

where $\Sigma_i \alpha^{(i)} = 1$ and $\alpha$ is a linear coefficient.

The mean square error (MSE) is the expected value of the linear combination:

$$E(\Sigma_i \alpha^{(i)} n^{(i)})^2 = \Sigma_i \alpha^{(i)2} E(n^{(i)2}) \qquad \text{Equation 7.}$$

The minimum mean square error (MMSE) is:

$$\alpha^{(i)} P^{(i)} / \Sigma_l P^{(l)} \qquad \text{Equation 8.}$$

The linear coefficient $\alpha^{(i)}$ is proportional to total pilot power of an OFDM symbol at the current pilot location. In the case of two symbols, the change in phase estimated for a symbol may be scaled down by a factor of:

$$P^{(2)}/(P^{(1)} + P^{(2)}) \qquad \text{Equation 9.}$$

where $P^{(i)}$ is the power of OFDM symbol i. If the pilot signals change, or the pilot signal moves in the frequency domain, an improved estimate is realized by weighing power over a full cycle of pilot frequency locations. The present design employs a scaling factor equal to $0.5 \, P^{(i)/max} P^{(l)}$.

The present design employs a FIFO power buffer $P^{(i)}$ having a size that equals the periodicity of the walking pilots. For example, if the pilot walks over 56 different frequencies before repeating, the FIFO buffer is size 56. The system initializes $P^{(i)}$ to be equal to the sum of estimated channel power for every frequency employed in a given walking pilot pattern or sequence. In this situation, for entry i in the FIFO power buffer, where k represents one subcarrier index of the subject walking pilot pattern, $$P^{(i)} = \Sigma_k \|\hat{H}_k^{(i)} s_k^{(i)}\|^2 \qquad \text{Equation 10.}$$

Initially, the system determines and stores the initial total power for later use, where initial total power is the sum of all estimated channel powers in the FIFO power buffer:

$$P_0 = \Sigma_i P^{(i)} \qquad \text{Equation 11.}$$

With every new received OFDM symbol, the system pushes an updated power estimate into the FIFO buffer and removes the oldest FIFO item, shifting each intervening FIFO entry accordingly. The updated power estimate, where k represents one subcarrier index of the subject walking pilot pattern, is:

$$P^{(i)} = \Sigma_k |(\hat{H}_k^{(i)} s_k(i))^H x_k^{(i)}|^2 \qquad \text{Equation 12.}$$

The removed FIFO buffer item is the previous power estimate for the same pilot frequency location.

The system then estimates the amplitude of the signal for the given pilot as:

$$\Sigma_i P^{(i)} P_0 \qquad \text{Equation 13.}$$

No additional averaging in time is needed as only one entry is updated in the FIFO buffer, and the value is intrinsically averaged in time. The difference in phase is calculated using the MRC as shown in Equation 2. The system may then scale this delta phase value (or phase error) using a scaling factor of $0.5 \, P^{(i)/max} P^{(l)}$.

Figure 5:
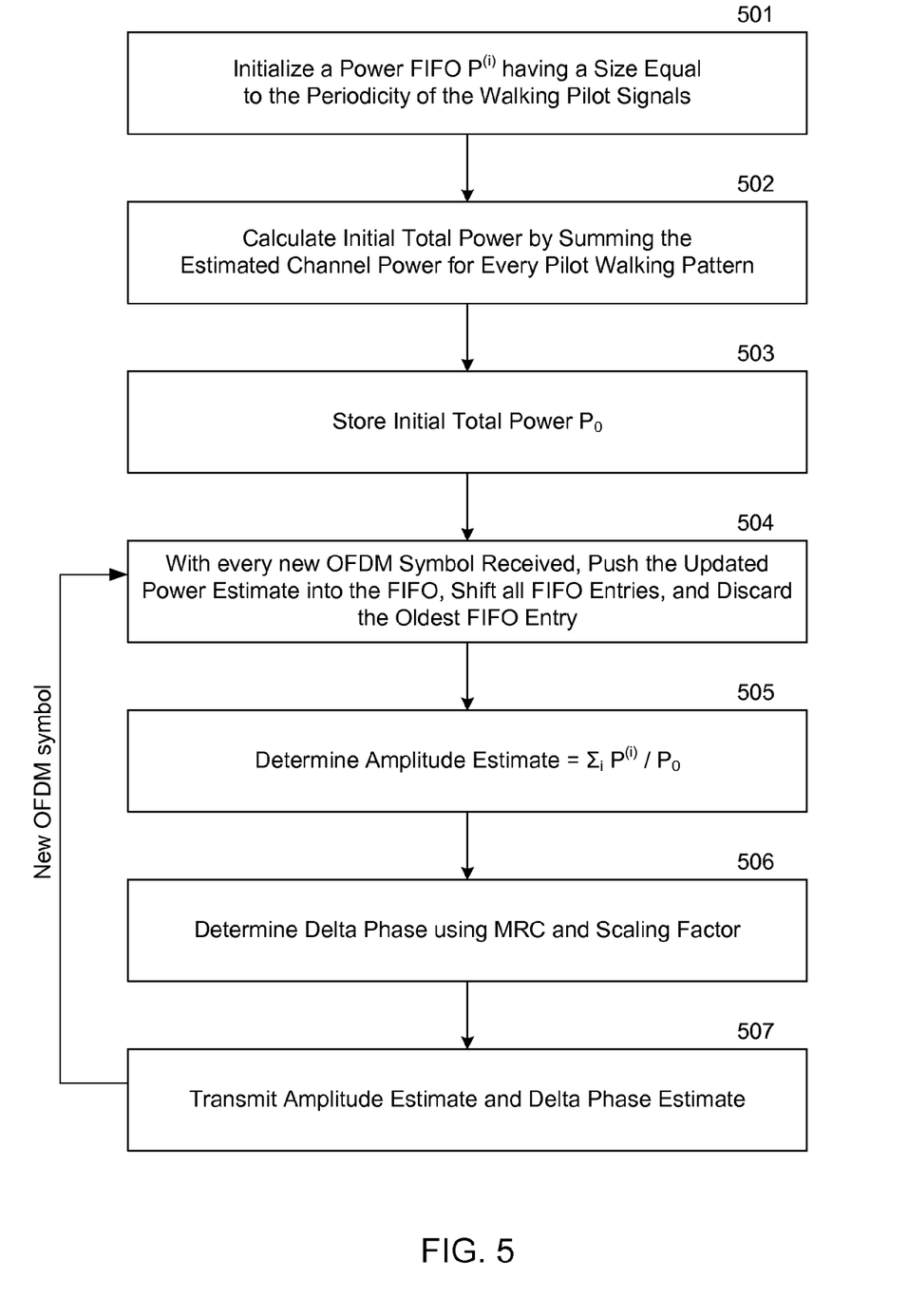
FIG. 5 illustrates a flowchart of operation of the present design.

A flowchart of the operation of the present design is provided in FIG. 5. From FIG. 5, the system allocates a power FIFO $P^{(i)}$ having a size equal to the periodicity of the walking pilot signal sequence in point 501. For example, if 56 signals are employed, $P^{(i)}$ is size 56, i.e. has 56 elements. The system determines an initial total power by summing the estimated channel power for every frequency employed in a given walking pilot walking pattern to form an initial total power at point 502. The system stores initial total power at point 503. At point 504, with every new OFDM symbol i received, the system determines an updated power estimate for entry $P^{(i)}$ corresponding to the walking pilot frequency, pushes the updated power estimate into the FIFO, shifts all FIFO buffer entries, and discards the oldest FIFO entry. At point 505, the system determines the amplitude estimate by summing the powers of all OFDM symbol indices i and dividing this sum by the initial total power. At point 506, the system determines the delta phase estimate (phase change estimate) using maximal ratio combining with a scaling factor applied. Point 507 transmits the amplitude estimate and the delta phase estimate for further processing.

Thus according to one aspect of the present design, there is provided A method for use in a wireless communication system receiver configured to receive a signal comprising a pilot signal that changes in frequency a number of times according to a sequence that repeats including initializing a FIFO buffer and summing estimated channel power over the sequence to determine an initial total power. The method also includes, for a new received symbol, determining an updated power estimate for the new received symbol, placing the updated power estimate in the FIFO buffer, and removing a least current value from the FIFO buffer, and estimating amplitude of the signal using a sum of all updated power estimates in the FIFO buffer divided by the initial total power. The method may further include determining a delta phase value using maximum ratio combining scaled with a scaling factor.

An apparatus implementing the techniques or circuits described herein may be a stand-alone device or may be part of a larger device. A device may be (i) a stand-alone IC, (ii) a set of one or more ICs that may include memory ICs for storing data and/or instructions, (iii) an RFIC such as an RF receiver (RFR) or an RF transmitter/receiver (RTR), (iv) an ASIC such as a mobile station modem (MSM), (v) a module that may be embedded within other devices, (vi) a receiver, cellular phone, wireless device, handset, or mobile unit, (vii) etc.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the scope of the disclosure. Thus, the disclosure is not intended to be limited to the examples and designs described herein but is to be accorded the widest scope consistent with the principles and novel features disclosed herein.

What is claimed is:

1. A method for use in a wireless communication system receiver configured to receive a signal comprising a plurality of symbols and a pilot signal that changes in frequency a number of times according to a nonsequential frequency sequence that repeats, the method comprising:
    initializing a FIFO buffer;
    summing estimated channel power over the nonsequential frequency sequence that repeats to determine an initial total power;
    for a new received symbol, determining an updated power estimate for the new received symbol, placing the updated power estimate in the FIFO buffer, and removing a least current value from the FIFO buffer;
    estimating amplitude of the signal using a sum of all updated power estimates in the FIFO buffer divided by the initial total power; and
    estimating symbol phase change based on the updated power estimate for the new received symbol.

2. The method of claim 1, wherein estimating symbol phase change comprises determining a delta phase value using maximum ratio combining scaled with a scaling factor.

3. The method of claim 1, further comprising repeating determining the updated power estimate, placing successive updated power estimates in the FIFO buffer, and removing the least current power estimate value from the FIFO buffer.

4. The method of claim 2, where the scaling factor is:

$$0.5 * P^{(i)}/\max_l P^{(l)}$$

wherein $P^{(i)}$ is a power of symbol i and $\max_l P^{(l)}$ is a maximum power of one symbol from all l symbols received.

5. The method of claim 1, wherein initializing the FIFO buffer comprises setting power in FIFO buffer position i to be equal to:

$$P^{(i)} = \Sigma_k \|\hat{H}_k^{(i)} s_k^{(i)}\|^2$$

wherein $\hat{H}_k^{(i)}$ is the estimate of the over the air transmission matrix of channel k and $s_k^{(i)}$ is the transmitted data from a transmitter over channel k for the $i^{th}$ sequence position where k is one subcarrier index of all subcarrier indices in the sequence.

6. The method of claim 1, wherein the updated power estimate for symbol i is calculated according to:

$$P^{(i)} = \Sigma_k |(\hat{H}_k^{(i)} s_k^{(i)})^H x_k^{(i)}|^2$$

wherein $\hat{H}_k^{(i)}$ is the estimate of the over the air transmission matrix of channel k, $s_k^{(i)}$ is the transmitted data from a transmitter over channel k for the $i^{th}$ sequence position, and $x_k^{(i)}$ is the received value on the $k^{th}$ channel where k is one subcarrier index of all subcarrier indices in the sequence.

7. The method of claim 1, wherein the updated power estimate replaces a previous power estimate of a same pilot frequency location in the sequence.

8. A wireless receiver comprising:
    a receiver configured to receive symbols and pilot signals that change in frequency according to a nonsequential frequency sequence that repeats; and
    a digital signal processor configured to:
        initialize a FIFO buffer;
        sum estimated channel power over the nonsequential frequency sequence that repeats to determine an initial total power;
        for a new received symbol, determine an updated power estimate for the new received symbol, place the updated power estimate in the FIFO buffer, and remove a least current value from the FIFO buffer;

estimate amplitude of the signal using a sum of all updated power estimates in the FIFO buffer divided by the initial total power; and estimate symbol phase change based on the updated power estimate for the new received symbol.

9. The wireless receiver of claim 8, wherein the digital signal processor is further configured to estimating the symbol phase change by determining a delta phase value using maximum ratio combining scaled with a scaling factor.

10. The wireless receiver of claim 9, wherein the digital signal processor is further configured to repeatedly determine the updated power estimate, place successive updated power estimates in the FIFO buffer, and remove the least current power estimate value from the FIFO buffer.

11. The wireless receiver of claim 10, where the scaling factor is:

$$0.5 * P^{(i)}/\max_l P^{(l)}$$

wherein $P^{(i)}$ is a power of symbol i and $\max_l P^{(l)}$ is a maximum power of one symbol from all l symbols received.

12. The wireless receiver of claim 9, wherein initializing the FIFO buffer comprises setting power in FIFO buffer position i to be equal to:

$$P^{(i)} = \Sigma_k \|\hat{H}_k^{(i)} s_k^{(i)}\|^2$$

wherein $\hat{H}_k^{(i)}$ is the estimate of the over the air transmission matrix of channel k and $s_k^{(i)}$ is the transmitted data from a transmitter over channel k for the $i^{th}$ sequence position where k is one subcarrier index of all subcarrier indices in the sequence.

13. The wireless receiver of claim 9, wherein the digital signal processor is configured to calculate the updated power estimate for symbol i according to:

$$P^{(i)} = \Sigma_k |(\hat{H}_k^{(i)} s_k^{(i)})^H x_k^{(i)}|^2$$

wherein $\hat{H}_k^{(i)}$ is the estimate of the over the air transmission matrix of channel k, $s_k^{(i)}$ is the transmitted data from a transmitter over channel k for the $i^{th}$ sequence position, and $x_k^{(i)}$ is the received value on the $k^{th}$ channel where k is one subcarrier index of all subcarrier indices in the sequence.

14. The wireless receiver of claim 9, wherein the updated power estimate replaces a previous power estimate of a same pilot frequency location in the sequence.

15. A receiver configured to receive a signal comprising a plurality of symbols and a pilot signal that changes in frequency a number of times according to a nonsequential frequency sequence that repeats, comprising:
means for initializing a FIFO buffer;
means for summing estimated channel power over the nonsequential frequency sequence that repeats to determine an initial total power;
means for determining an updated power estimate for a new received symbol, placing the updated power estimate in the FIFO buffer, and removing a least current value from the FIFO buffer;
means for estimating amplitude of the signal using a sum of all updated power estimates in the FIFO buffer divided by the initial total power; and
means for estimating symbol phase change based on the updated power estimate for the new received symbol.

16. The receiver of claim 15, wherein the means for estimating symbol phase change comprise means for determining a delta phase value using maximum ratio combining scaled with a scaling factor.

17. The receiver of claim 15, further comprising means for repeating determining the updated power estimate, placing successive updated power estimates in the FIFO buffer, and removing the least current power estimate value from the FIFO buffer.

18. The receiver of claim 16, where the scaling factor is:

$$0.5 * P^{(i)}/\max_l P^{(l)}$$

wherein $P^{(i)}$ is a power of symbol i and $\max_l P^{(l)}$ is a maximum power of one symbol from all l symbols received.

19. The receiver of claim 15, wherein the means for initializing the FIFO buffer comprises means for setting power in FIFO buffer position i to be equal to:

$$P^{(i)} = \Sigma_k \|\hat{H}_k^{(i)} s_k^{(i)}\|^2$$

wherein $\hat{H}_k^{(i)}$ is the estimate of the over the air transmission matrix of channel k and $s_k^{(i)}$ is the transmitted data from a transmitter over channel k for the $i^{th}$ sequence position where k is one subcarrier index of all subcarrier indices in the sequence.

20. The receiver of claim 15, wherein the updated power estimate for symbol i is calculated according to:

$$P^{(i)} = \Sigma_k |(\hat{H}_k^{(i)} s_k^{(i)})^H x_k^{(i)}|^2$$

wherein $\hat{H}_k^{(i)}$ is the estimate of the over the air transmission matrix of channel k, $s_k^{(i)}$ is the transmitted data from a transmitter over channel k for the $i^{th}$ sequence position, and $x_k^{(i)}$ is the received value on the $k^{th}$ channel where k is one subcarrier index of all subcarrier indices in the sequence.

21. The receiver of claim 15, wherein the updated power estimate replaces a previous power estimate of a same pilot frequency location in the sequence.

22. A non-transitory computer readable storage medium comprising instructions that, when executed by a processor, perform a method for processing a signal comprising a plurality of symbols and a pilot signal that changes in frequency a number of times according to a nonsequential frequency sequence that repeats, the method comprising:
initializing a FIFO buffer;
summing estimated channel power over the nonsequential frequency sequence that repeats to determine an initial total power;
for a new received symbol, determining an updated power estimate for the new received symbol, placing the updated power estimate in the FIFO buffer, and removing a least current value from the FIFO buffer;
estimating amplitude of the signal using a sum of all updated power estimates in the FIFO buffer divided by the initial total power; and
estimating symbol phase change based on the updated power estimate for the new received symbol.

23. The non-transitory computer readable storage medium of claim 22, wherein estimating symbol phase change comprises determining a delta phase value using maximum ratio combining scaled with a scaling factor.

24. The non-transitory computer readable storage medium of claim 22, the method further comprising repeating determining the updated power estimate, placing successive updated power estimates in the FIFO buffer, and removing the least current power estimate value from the FIFO buffer.

25. The non-transitory computer readable storage medium of claim 23, where the scaling factor is:

$$0.5 * P^{(i)}/\max_l P^{(l)}$$

wherein $P^{(i)}$ is a power of symbol i and $\max_l P^{(l)}$ is a maximum power of one symbol from all l symbols received.

26. The non-transitory computer readable storage medium of claim 22, wherein initializing the FIFO buffer comprises setting power in FIFO buffer position i to be equal to:

$$P^{(i)} = \Sigma_k \|\hat{H}_k^{(i)} s_k^{(i)}\|^2$$

wherein $\hat{H}_k^{(i)}$ is the estimate of the over the air transmission matrix of channel k and $s_k^{(i)}$ is the transmitted data from a transmitter over channel k for the $i^{th}$ sequence position where k is one subcarrier index of all subcarrier indices in the sequence.

27. The non-transitory computer readable storage medium of claim 22, wherein the updated power estimate for symbol i is calculated according to:

$$P^{(i)} = \Sigma_k |(\hat{H}_k^{(i)} s_k^{(i)})^H x_k^{(i)}|^2$$

wherein $\hat{H}_k^{(i)}$ is the estimate of the over the air transmission matrix of channel k, $s_k^{(i)}$ is the transmitted data from a transmitter over channel k for the $i^{th}$ sequence position, and $x_k^{(i)}$ is the received value on the $k^{th}$ channel where k is one subcarrier index of all subcarrier indices in the sequence.

28. The non-transitory computer readable storage medium of claim 22, wherein the updated power estimate replaces a previous power estimate of a same pilot frequency location in the sequence.

29. The method of claim 1, wherein the FIFO buffer is sized based on size of the nonsequential frequency sequence.

30. The wireless receiver of claim 8, wherein the FIFO buffer is sized based on size of the nonsequential frequency sequence.

31. The receiver of claim 15, wherein the FIFO buffer is sized based on size of the nonsequential frequency sequence.

32. The non-transitory computer readable storage medium of claim 22, wherein the FIFO buffer is sized based on size of the nonsequential frequency sequence.

* * * * *